US009855700B2

United States Patent
Tateyama et al.

(10) Patent No.: US 9,855,700 B2
(45) Date of Patent: Jan. 2, 2018

(54) THERMOPLASTIC RESIN MOLDED ARTICLE HAVING HOLLOW PORTION AND METHOD OF MANUFACTURING SAME

(71) Applicant: Toray Industries, Inc., Tokyo (JP)

(72) Inventors: Masaru Tateyama, Nagoya (JP); Masayuki Koshi, Nagoya (JP)

(73) Assignee: Toray Industries, Inc. (JP)

( * ) Notice: Subject to any disclaimer, the term of this patent is extended or adjusted under 35 U.S.C. 154(b) by 428 days.

(21) Appl. No.: 14/364,385

(22) PCT Filed: Dec. 25, 2012

(86) PCT No.: PCT/JP2012/083383
§ 371 (c)(1),
(2) Date: Jun. 11, 2014

(87) PCT Pub. No.: WO2013/099828
PCT Pub. Date: Jul. 4, 2013

(65) Prior Publication Data
US 2015/0231817 A1   Aug. 20, 2015

(30) Foreign Application Priority Data

Dec. 28, 2011   (JP) .................................. 2011-287864

(51) Int. Cl.
*B29C 51/02*   (2006.01)
*B29C 51/10*   (2006.01)
(Continued)

(52) U.S. Cl.
CPC ........ *B29C 51/002* (2013.01); *B29K 2023/00* (2013.01); *B29K 2033/04* (2013.01);
(Continued)

(58) Field of Classification Search
CPC ........................... B29C 51/006; B29C 70/081
See application file for complete search history.

(56) References Cited

U.S. PATENT DOCUMENTS 4,457,797 A * 7/1984 Hatchadoorian ..... B29C 51/002
156/242
2007/0243368 A1* 10/2007 Edwards ............... B29C 70/081
428/292.1
(Continued)

FOREIGN PATENT DOCUMENTS

JP   05309724 A   * 11/1993

OTHER PUBLICATIONS

JP H05-309724 A (Ohara) Nov. 22, 1993 (English language machine translation). [online] [retrieved Jul. 19, 2016]. Retrieved from: Espacenet.*

*Primary Examiner* — Erin Snelting
(74) *Attorney, Agent, or Firm* — DLA Piper LLP (US)

(57) ABSTRACT

A method of manufacturing a thermoplastic resin molded article having a hollow portion includes setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion.

17 Claims, 7 Drawing Sheets

(51) Int. Cl.
  *B29C 51/00*   (2006.01)
  *B29K 81/00*   (2006.01)
  *B29K 23/00*   (2006.01)
  *B29K 77/00*   (2006.01)
  *B29K 67/00*   (2006.01)
  *B29K 33/04*   (2006.01)
  *B29K 55/02*   (2006.01)
  *B29K 69/00*   (2006.01)

(52) U.S. Cl.
  CPC ...... *B29K 2055/02* (2013.01); *B29K 2067/00* (2013.01); *B29K 2069/00* (2013.01); *B29K 2077/00* (2013.01); *B29K 2081/04* (2013.01)

(56) References Cited

U.S. PATENT DOCUMENTS

| | | | | |
|---|---|---|---|---|
| 2011/0147995 A1* | 6/2011 | Fingerhut | ............ | B29C 51/085 264/322 |
| 2012/0060960 A1* | 3/2012 | Sumi | ................... | B29C 47/366 138/141 |
| 2013/0108824 A1* | 5/2013 | Berger | ................... | D04H 3/002 428/113 |
| 2013/0136890 A1* | 5/2013 | Maliszewski | ......... | B29C 47/004 428/113 |

\* cited by examiner

THERMOPLASTIC RESIN MOLDED ARTICLE HAVING HOLLOW PORTION AND METHOD OF MANUFACTURING SAME

TECHNICAL FIELD

This disclosure relates to a thermoplastic resin molded article having a hollow portion and a method of manufacturing the same and, specifically, to a thermoplastic resin molded article having a hollow portion, suitable as a thin, large-area and large-sized molded article part of which is formed in a hollow structure part, and a method of manufacturing the same.

BACKGROUND

As a method of integrally molding a resin hollow molded article having a hollow structure part at least as a part, although molding methods such as blow molding, gas assisted molding and die slide injection are known, even in any molding method, it is difficult to mold a thin and large-area molded article part of which is formed in a hollow structure part. On the other hand, as a method of molding a thin and large-area molded article, although stamping molding and other molding methods are known (for example, JP-A-HEI 05-117411, JP-A-2004-142165, JP-A-HEI 05-309724, JP-A-HEI 05-185466 and WO 2007/013385), in those conventional molding methods, it is extremely difficult to form a hollow structure part.

Therefore, in the molding of a thin and large-area resin molded article part of which is formed in a hollow structure part, a molded article having a predetermined structure has been manufactured by dividing the final structure of the molded article, molding respective divided parts in the first place, and bonding or welding the respective molded parts. In such a production method, however, as the molded article to be molded becomes larger, because much time is required in the case of bonding and because the welding machine becomes an impractical scale in the case of welding, a technology capable of manufacturing a thin and large-area molded article, part of which is formed in a hollow structure part, more easily is strongly needed.

It could therefore be helpful to provide an efficiently and accurately produced thermoplastic resin molded article having an easily targeted structure, even when it is required to form a structure of a thin and large-area resin molded article part of which is formed in a hollow structure.

SUMMARY

We provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion.

We also provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin.

We further provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, and wherein reinforcing fibers of the fiber reinforced thermoplastic resin are at least one kind of fibers selected from the group consisting of carbon fibers, glass fibers and aramide fibers.

We also further provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, and wherein reinforcing fibers of the fiber reinforced thermoplastic resin include discontinuous fibers.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include discontinuous fibers, and wherein a weight average fiber length of the discontinuous fibers is 10 mm or more.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include discontinuous fibers, and wherein a content of the discontinuous fibers in the fiber reinforced thermoplastic resin is 5 to 50 wt %.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, and wherein reinforcing fibers of the fiber reinforced thermoplastic resin include continuous fibers.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include continuous fibers, and wherein the reinforcing fibers include continuous fibers arranged in one direction.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include continuous fibers, and wherein a content of the continuous fibers in the fiber reinforced thermoplastic resin is 1 to 80 wt %.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include continuous fibers, and wherein the reinforcing fibers of the fiber reinforced thermoplastic resin are formed as a woven fabric.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include continuous fibers and wherein the thermoplastic resin plate (B) includes a tape-like fiber reinforced thermoplastic resin pre-integrated with reinforcing fibers arranged in one direction and a thermoplastic resin by heat press.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein at least the thermoplastic resin plate (B) among the molded article (A) and the thermoplastic resin plate (B) includes a fiber reinforced thermoplastic resin, wherein reinforcing fibers of the fiber reinforced thermoplastic resin include continuous fibers, wherein the thermoplastic resin plate (B) includes a tape-like fiber reinforced thermoplastic resin pre-integrated with reinforcing fibers arranged in one direction and a thermoplastic resin by heat press and wherein a tape width of the tape-like fiber reinforced thermoplastic resin is 6 to 50 mm.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein a die having fine holes that suck air from an interior of a cavity is used as the second die.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein a die having fine suction holes that retain the molded article (A) is used as the first die.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein a die having fine holes that suck air from an interior of a cavity is used as the second die, and wherein a thermoplastic resin film is layered on a non-contact surface of the thermoplastic resin plate (B) relative to the second die to form the thermoplastic resin plate (B).

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein a thermoplastic resin forming the molded article (A) and the thermoplastic resin plate (B) includes at least one selected from the group consisting of a polyphenylene sulfide resin, a polyamide resin, a polyolefin resin, a polyester resin, an ABS resin, a polycarbonate resin and a polyacetal resin.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein the thermoplastic resin plate (B) is formed while an outer circumferential part of the thermoplastic resin plate (B) is held down.

We further yet provide a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion, wherein a heater is provided at a portion corresponding to at least part of the welded region at least in the second die, and the welding is performed utilizing heat from the heater.

We further yet provide a thermoplastic resin molded article having a hollow portion manufactured by a method of manufacturing a thermoplastic resin molded article having a hollow portion including setting a molded article (A) premolded from a thermoplastic resin in a first die, forming a melted thermoplastic resin plate (B) in a shape along an inner surface of a second die facing the first die by being attached to the inner surface of the second die by vacuum pressure, welding the thermoplastic resin plate (B) and the molded article (A) only in a predetermined region by mold-clamping the first die and the second die, and forming at least part of an unwelded region as a hollow portion and having an upper surface having a surface area of 1 m² or more.

In the thermoplastic resin molded article having a hollow portion and the method of manufacturing the same, a thin, large-area and large-sized thermoplastic resin molded article part of which is formed in a hollow structure part can be easily and efficiently manufactured in a short period of time, and moreover accurately. In particular, a thin, large-area and large-sized thermoplastic resin molded article part of which is formed in a hollow structure part, in which at least the thermoplastic resin plate (B) comprises a fiber reinforced thermoplastic resin, can be manufactured easily.

Figure 1:
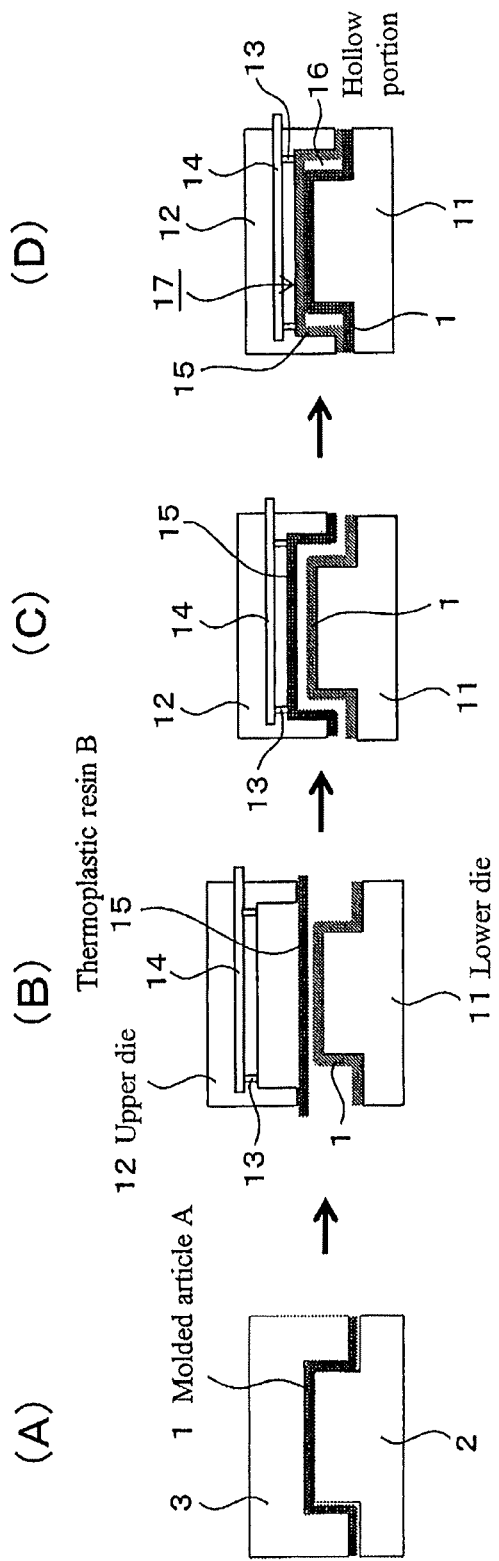
FIG. 1 is a process flow diagram showing a method of manufacturing an example of our thermoplastic resin molded articles.

EXPLANATION OF SYMBOLS 1, 23, 63, 73, 81, 103, 123: molded article (A)
2, 11, 25, 66, 75, 82: lower die as first die
3, 12, 34, 43, 53: upper die as second die
13, 36, 44, 55, 104, 108: fine hole
14, 105, 109: suction path
15, 35, 46, 56, 107, 124: thermoplastic resin plate (B)
16, 21, 31, 41, 51, 61a, 61b, 71, 76, 83, 112, 125: hollow portion 17, 22, 32, 42, 52, 62, 72, 84, 113, 126: thermoplastic resin molded article
24, 33, 45, 54, 74: recessed portion
64: projected portion
65: upper surface convex
91, 101, 121: upper die as first die
92: molded article (A)
93: suction hole
94: suction path
95, 106, 111: vacuum line
96: vacuum pump
97: adhesive tape
98: undercut portion
102, 122: lower die as second die
110: pressing means
127, 128: heater as heating means

DETAILED DESCRIPTION

We provide a method of manufacturing a thermoplastic resin molded article having a hollow portion wherein a molded article (A) premolded from a thermoplastic resin is set in a first die, a melted thermoplastic resin plate (B) is formed in a shape along an inner surface of a second die facing the first die by being attached to the inner surface of the second die by vacuum pressure, the thermoplastic resin plate (B) and the molded article (A) are welded only in a predetermined region by mold-clamping the first die and the second die, and at least part of an unwelded region is formed as a hollow portion. When the mold comprises an upper die and a lower die, any one of the upper die and the lower die may be used as the above-described first die, and the other die may be used as the above-described second die.

In such a method of manufacturing a thermoplastic resin molded article having a hollow portion, the molded article (A) composed of a thermoplastic resin is premolded in a predetermined shape and set in the first die, and the thermoplastic resin plate (B) is welded to the molded article (A). The thermoplastic resin plate (B) is, at a melted condition, attached to the inner surface of the second die by vacuum pressure, and formed in a shape along the inner surface of the second die by the attachment, and it is retained strongly and well at the condition being contacted with the inner surface of the second die even if it is a thin and large-area thermoplastic resin plate (B). At the same time as this forming or after the forming, by mold-clamping the first die and the second die, the thermoplastic resin plate (B) and the molded article (A) are welded only in a predetermined region, and at least part of an unwelded region which is not welded is formed as a hollow portion. As considered with the hollow portion, the part of the thermoplastic resin plate (B) attached to the inner surface of the second die, formed in a shape along the inner surface of the second die and retained strongly to the inner surface of the second die is positioned with a space relatively to the part of the molded article (A) set on the first die, and a portion between both parts is formed as the hollow portion. Since the molded article (A) set on the first die, and the thermoplastic resin plate (B) attached to the inner surface of the second die, formed in a shape along the inner surface of the second die and strongly retained to the inner surface of the second die, are positioned by the mold clamping over the whole accurately at a time, even when the hollow portion to be formed has a large area, has a long dimension or has a complicated plane shape or even when a plurality of hollow portions are formed at positions different from each other or the like, a desired hollow portion is formed accurately, easily, and efficiently in a very short period of time. Further, because the molded article (A) is premolded by stamping molding or the like, it can be molded in a predetermined thin shape easily and accurately, and because the thermoplastic resin plate (B) is, at a melted condition, attached to the inner surface of the second die by vacuum pressure, and formed in a shape along the inner surface of the second die by the attachment, it is easily molded in a thin shape and is maintained accurately at the thin shape until reaching completion of the mold clamping. Since the thermoplastic resin plate (B) maintained accurately at the predetermined thin shape is welded to the molded article (A) by the mold clamping, the hollow portion to be formed is also formed easily in a predetermined shape, and a thermoplastic resin molded article accurately realized with a target formation can be manufactured efficiently and easily in a short period of time.

Although the above-described method of manufacturing a thermoplastic resin molded article can be applied where the molded article (A) and the thermoplastic resin plate (B) are both composed of only resins, in particular, it is a suitable method where at least the thermoplastic resin plate (B) among the molded article (A) and the thermoplastic resin plate (B) comprises a fiber reinforced thermoplastic resin. Of course, it is suitable also for when both the molded article (A) and the thermoplastic resin plate (B) comprise fiber reinforced thermoplastic resins. When at least the thermoplastic resin plate (B) comprises a fiber reinforced thermoplastic resin, when the thermoplastic resin plate (B) at a melted condition is attached to the inner surface of the second die by vacuum pressure, deformation of flow down of the resin, which is melted and becomes low in viscosity, can be prevented or suppressed by the presence of the reinforcing fibers, and even if it is a thin and large-area thermoplastic resin plate (B), more easily the mold clamping can be carried out while it is kept at a predetermined attachment condition. As a result, molding of the thermoplastic resin molded article having a predetermined hollow portion can be facilitated. Namely, a fiber reinforced thermoplastic resin molded article having a hollow portion can be easily manufactured.

When at least the thermoplastic resin plate (B) comprises a fiber reinforced thermoplastic resin, the reinforcing fibers of the fiber reinforced thermoplastic resin are not particularly restricted and, for example, at least one kind of fiber selected from the group consisting of carbon fibers, glass fibers and aramide fibers can be used. A hybrid structure using two or more kinds of reinforcing fibers of these reinforcing fibers and other reinforcing fibers can also be employed.

Further, as the form of the reinforcing fibers of the fiber reinforced thermoplastic resin, for example, discontinuous fibers can be employed. By using discontinuous fibers as the reinforcing fibers, the dispersion of the reinforcing fibers in the thermoplastic resin plate (B) at a melted condition can be easily maintained at a uniform condition, and formability (drape property) can be improved when it is formed in a shape along the inner surface of the second die by attachment, thereby, consequently, contributing to improvement of the uniformity of the mechanical properties and the quality of the surface of a finally molded article.

It is preferred that the weight average fiber length of the above-described discontinuous fibers is 10 mm or more. If it is less than 10 mm, the effect of enhancement of the mechanical properties of the molded article, that is an original purpose of reinforcing fibers, becomes poor. Further, it is preferred that the content of the above-described discontinuous fibers in the above-described fiber reinforced thermoplastic resin is 5 to 50 wt. %. If it is less than this range, the effect of enhancement of the mechanical properties of the molded article becomes too poor, and if it is over the range, there accurate attachment to the inner surface of the upper die becomes difficult.

On the other hand, continuous fibers can also be used as the reinforcing fibers of the above-described fiber reinforced thermoplastic resin. Of course, a combination of the above-described discontinuous fibers and continuous fibers can be employed. By using continuous fibers as the reinforcing fibers, it becomes possible to give a desired anisotropy (for example, predetermined mechanical properties in a specified direction) or formation maintaining property. Further, since a fiber reinforced resin molded article using reinforcing fibers comprising continuous fibers can exhibit high mechanical properties in the direction of the orientation of the continuous fibers, it becomes possible to increase the mechanical properties of the molded article after molding.

As the above-described continuous fibers, for example, the reinforcing fibers may comprise continuous fibers arranged in one direction. By such an arrangement of the reinforcing fibers comprising continuous fibers in one direction, it becomes possible to peculiarly enhance the mechanical properties in that direction, and an optimum design in accordance with use of the molded article becomes possible.

Further, it is preferred that the content of the above-described continuous fibers in the above-described fiber reinforced thermoplastic resin is 1 to 80 wt. %. If the content is less than this range, the effect of enhancing the mechanical properties of the molded article becomes too poor, and a content over this range is difficult to be realized, because practically the amount of resin becomes too small even when the reinforcing fibers comprise continuous fibers.

Furthermore, it is also possible that the reinforcing fibers of the fiber reinforced thermoplastic resin are formed as a woven fabric. As the form of the woven fabric, a unidirectional woven fabric in which the above-described continuous fibers arranged in one direction are woven by auxiliary yarns, a woven fabric which is woven by continuous reinforcing fibers used as warps and wefts or the like can be used. By employing the form of a woven fabric, because a formation maintaining property can be given to the reinforcing fibers themselves, it becomes possible to maintain the form of the reinforcing fibers in the fiber reinforced thermoplastic resin easily at a target form. As a result, it can be realized more securely to enhance the formation maintaining property of the thermoplastic resin plate (B) before or at the time of melting of the thermoplastic resin plate (B) and to achieve target mechanical properties of a thermoplastic resin finally molded article.

Further, when the above-described thermoplastic resin plate (B) contains reinforcing fibers comprising the above-described continuous fibers, for example, the thermoplastic resin plate (B) may comprise a tape-like fiber reinforced thermoplastic resin pre-integrated with reinforcing fibers arranged in one direction and a thermoplastic resin by heat press. In such a thermoplastic resin plate (B) comprising a tape-like fiber reinforced thermoplastic resin, handling ability can be improved, and by containing the reinforcing fibers arranged in one direction, it becomes possible to efficiently enhance the mechanical properties in a specified direction, thereby performing an optimum design in accordance with use of the molded article more easily.

When such a thermoplastic resin plate (B) comprising a tape-like fiber reinforced thermoplastic resin is used, in consideration of the handling ability and the retaining property and formability when attached to the inner surface of the second die, it is preferred that the tape width thereof is 6 to 50 mm.

Further, it is preferred that a die having fine holes that suck air from an interior of a cavity is used as the above-described second die. In particular, by disposing a plurality of fine holes at adequate positions, even in case of a thin and large-area thermoplastic resin plate (B), it becomes possible to attach the thermoplastic resin plate (B) to the inner surface of the second die more easily and more securely, thereby facilitating the mold clamping, ultimately, the molding of the whole.

Further, also as the above-described first die, a die having fine suction holes for retaining the molded article (A) can be used. Such a formation is effective particularly when an upper die of upper and lower dies is used as the first die and the molded article (A) is retained on the lower surface side of the upper die.

Further, when the thermoplastic resin plate (B) is formed along the inner surface of the above-described second die and the thermoplastic resin plate (B) and the molded article (A) are welded, such a manner can also be employed that a thermoplastic resin film is layered on a non-contact surface of the thermoplastic resin plate (B) relative to the above-described second die to form the thermoplastic resin plate (B). In such a manner, in particular when the thermoplastic resin plate (B) is attached to the inner surface of the second die through suction from the fine holes as described above, because that part of the thermoplastic resin plate (B) becomes porous to allow air for suction to pass therethrough and that portion causes an insufficient suction, occurrence of such an inconvenience can be easily prevented.

Further, although the resins forming the molded article (A) and the thermoplastic resin plate (B) are not particularly limited, as a preferable thermoplastic resin, at least one or more of a polyphenylene sulfide resin, a polyamide resin, a polyolefin resin, a polyester resin, an ABS resin, a polycarbonate resin and a polyacetal resin can be exemplified.

Further, the thermoplastic resin plate (B) can also be formed while an outer circumferential part of the thermoplastic resin plate (B) is held down. In such a manner, an undesired positional shift of the thermoplastic resin plate (B) at the time of forming can be efficiently prevented, and a desired forming can be performed at a desirable position relative to the second die.

Furthermore, a manner can also be employed wherein a heating means is provided (for example, a heater is embedded) at a portion corresponding to at least part of the above-described welded region at least in the above-described second die, and the welding is performed utilizing heating due to the heating means. Of course, the heating means may be provided to each of the first die and the second die. By providing such a heating means, the predetermined welding between the thermoplastic resin plate (B) and the molded article (A) can be facilitated. Further, if the heating means is provided over the forming region of the thermoplastic resin plate (B), it can be used also to heat or melt the thermoplastic resin plate (B), and a series of operations with respect to the forming can be further facilitated.

We also provide a thermoplastic resin molded article having a hollow portion manufactured by the above-described method and has an upper surface having a surface area of 1 m$^2$ or more. Namely, the above-described method is suitable particularly for manufacturing a thin and large-area thermoplastic resin molded article, and in particular manufacturing a large-sized molded article in which the surface area of the upper surface formed by the thermoplastic resin plate (B) is 1 m² or more. We also provide such a large-sized thermoplastic resin molded article having a hollow portion. As such a large-sized thermoplastic resin molded article having a hollow portion, for example, a vehicle, in particular, a monocoque body of an automobile or a large-sized bonnet, further, panels and the like of various large-sized structural bodies, can be exemplified.

Hereinafter, concrete examples of our articles and methods will be explained referring to figures.

In the examples shown in FIGS. 1-8, although a formation is exemplified wherein a lower die is used as the first die and an upper die is used as the second die, an upper die may be used as the first die and a lower die may be used as the second die. FIG. 1 shows respective steps of a method of manufacturing a thermoplastic resin molded article according to an example. Step (A) shown in FIG. 1 shows an example of molding a molded article (A) (1) premolded and comprising a thermoplastic resin or a fiber reinforced thermoplastic resin. In this example, the molded article (A) (1) is premolded by press molding which uses a lower die 2 and an upper die 3 for premolding.

In step (B), the above-described molded article (A) (1), which is premolded, is set on a lower die 11 as the first die in the method of manufacturing a thermoplastic resin molded article having a hollow portion. It is also possible to use this lower die 11 also as the above-described lower die 2 for premolding. A die having a plurality of fine holes 13 for sucking air from an interior of a cavity is used as an upper die 12 as the second die used for the molding of this thermoplastic resin molded article having a hollow portion, and by suction through a suction path 14 communication respective fine holes 13, and the respective fine holes 13, a melted thermoplastic resin plate (B) (15) is attached to the inner surface of upper die 12 by vacuum pressure (step (C)), and by the attachment, the melted thermoplastic resin plate (B) (15) is formed in a shape along the inner surface of upper die 12. This thermoplastic resin plate (B) (15) may be formed only by a thermoplastic resin, or may be formed by a fiber reinforced thermoplastic resin containing reinforcing fibers.

While the above-described attachment and the forming of the thermoplastic resin plate (B) (15) are performed. or, after the attachment and the forming of the thermoplastic resin plate (B) (15) are completed, while the condition of the attachment is maintained, upper die 12 is mold-clamped relatively to lower die 11 (step (D)). By this mold-clamping, the thermoplastic resin plate (B) (15) at a condition being melted and the molded article (A) (1) at a condition being molded and solidified are press-contacted and welded only in a predetermined region (only in a region to be bonded), and at least part of an unwelded region is formed as a hollow portion 16. Thereafter, the thermoplastic resin plate (B) (15) at a condition being melted is cooled and solidified, thereby completing the molding of a thermoplastic resin molded article 17 having the hollow portion 16.

In such a method of manufacturing a thermoplastic resin molded article having a hollow portion, since the melted thermoplastic resin plate (B) (15) is attached to the inner surface of upper die 12 by vacuum pressure, and by the attachment, it is formed in a shape along the inner surface of upper die 12, it is easily molded in a thin and predetermined shape, and since it can be maintained accurately at the thin and predetermined shape by the time of completion of the mold-clamping, a target hollow portion can also be formed easily and, therefore, even in the case of thin and large area condition, a thermoplastic resin molded article having a desired hollow portion can be easily and efficiently in a short period of time.

The above-described method of manufacturing a thermoplastic resin molded article having a hollow portion can employ, for example, various examples as shown in FIGS. 2 to 8 except the example shown in FIG. 1. In the example shown in FIG. 2, as compared to the example shown in FIG. 1, to manufacture a thermoplastic resin molded article 22 having more hollow portions, in particular, having a hollow portion 21 also in the central part, a recessed portion 24 has been formed at the central part of a molded article (A) (23) which is premolded, this molded article (A) (23) is set on a lower die 25 (step (A)), similarly to the example shown in FIG. 1, the melted thermoplastic resin plate (B) (15) is attached to the inner surface of upper die 12 by vacuum pressure to be formed in a shape along the inner surface of the upper die 12 (step (B)), and the thermoplastic resin plate (B) (15) is welded to the molded article (A) (23) by mold-clamping only in a predetermined region (step (C)). By such a molding, the thermoplastic resin molded article 22 having the hollow portion 21 in addition to the hollow portion 16 can be manufactured.

Figure 2:
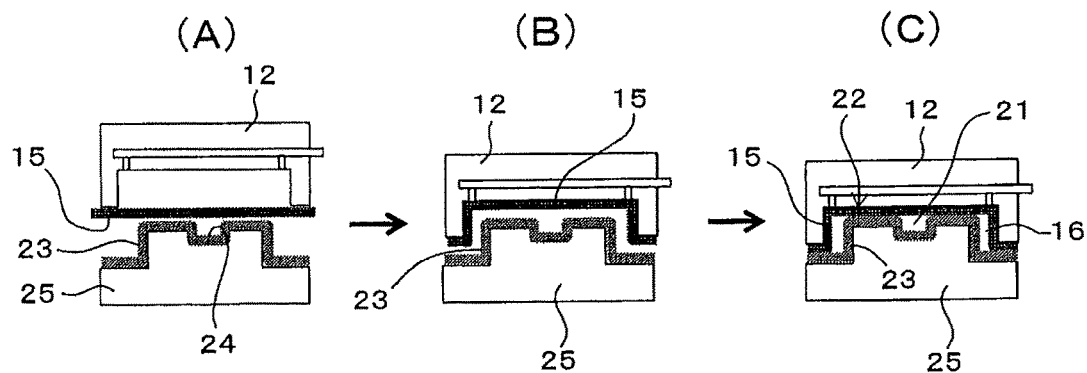
FIG. 2 is a process flow diagram showing a method of manufacturing a thermoplastic resin molded article according to another example.
Figure 3:
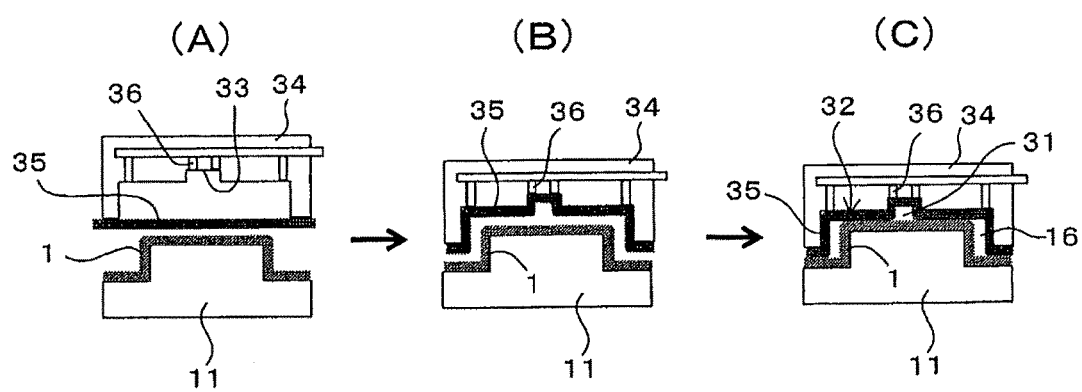
FIG. 3 is a process flow diagram showing a method of manufacturing a thermoplastic resin molded article according to a further example.

Further, in the example shown in FIG. 3, as compared to the example shown in FIG. 1, although a thermoplastic resin molded article 32 having a hollow portion 31 also in the central part is manufactured similarly to the example shown in FIG. 2, in this example, as a molded article (A) (1) which is premolded, one similar to that shown in FIG. 1 is used, and the molded article (A) (1) is set on the lower die 11 (step (A)). An upper die 34 having a recessed portion 33 at the central part of the inner surface is used, a melted thermoplastic resin plate (B) (35) is attached to the inner surface of the upper die 34 by vacuum pressure to be formed in a shape along the inner surface of the upper die 34 (step (B)), and the thermoplastic resin plate (B) (35) is welded to the molded article (A) (1) by mold-clamping only in a predetermined region (step (C)). To well attach the thermoplastic resin plate (B) (35) by vacuum pressure relative also to the recessed portion 33 at the central part of the inner surface of the upper die 34, also for this part, fine holes 36 for sucking air from the interior of the cavity are appropriately disposed. By such a molding, the thermoplastic resin molded article 32 having the convex-like hollow portion 31 at the upper surface of the molded article in addition to the hollow portion 16 can be manufactured.

Figure 4:
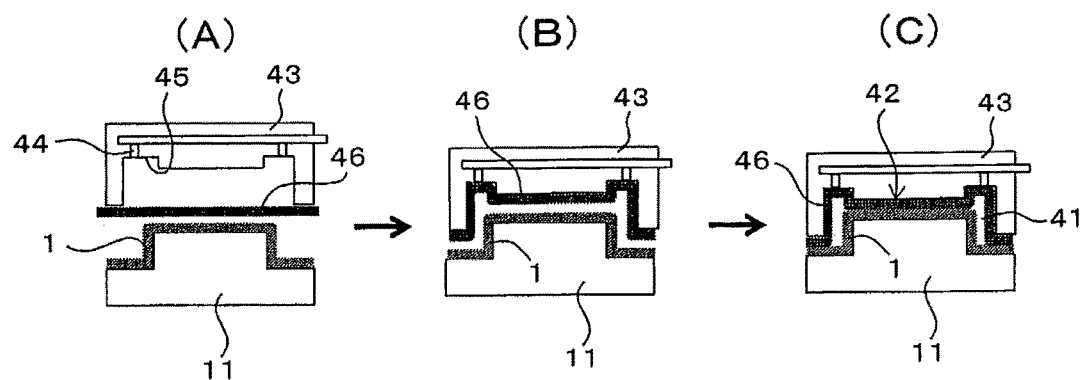
FIG. 4 is a process flow diagram showing a method of manufacturing a thermoplastic resin molded article according to a still further example.

Further, in the example shown in FIG. 4, as compared to the example shown in FIG. 1, a thermoplastic resin molded article 42 having a hollow portion 41 formed at the circumferential part of the molded article and protruded at the upper surface of the molded article also upwardly is manufactured. In this example, as a molded article (A) (1) which is premolded, one similar to that shown in FIG. 1 is used, and the molded article (A) (1) is set on the lower die 11 (step (A)). As compared to the example shown in FIG. 1, an upper die 43 having a recessed portion 45 at the part of the inner surface of the die corresponding to the part located with fine holes 44 is used, a melted thermoplastic resin plate (B) (46) is attached to the inner surface of the upper die 44 by vacuum pressure to be formed in a shape along the inner surface of the upper die 44 (step (B)), and the thermoplastic resin plate (B) (46) is welded to the molded article (A) (1) by mold-clamping only in a predetermined region (step (C)). By such a molding, the thermoplastic resin molded article 42 having the larger hollow portion 41 protruded in a convex-like form at the upper surface side of the molded article can be manufactured.

Figure 5:
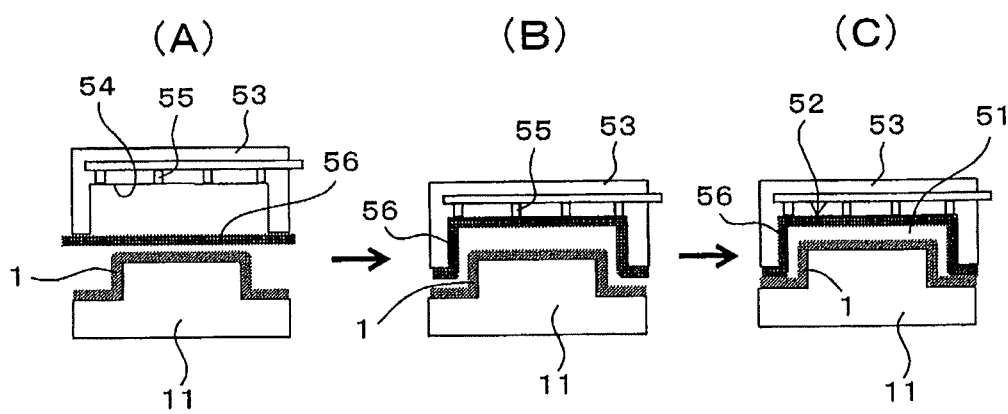
FIG. 5 is a process flow diagram showing a method of manufacturing a thermoplastic resin molded article according to a still further example.

Further, in the example shown in FIG. 5, as compared to the example shown in FIG. 1, a thermoplastic resin molded article 52 having a larger-area hollow portion 51 is manufactured. In this example, as a molded article (A) (1) which is premolded, one similar to that shown in FIG. 1 is used, and the molded article (A) (1) is set on the lower die 11 (step (A)). As compared to the example shown in FIG. 1, an upper die 53 having a larger-area recessed portion 54 at the part of the inner surface of the die and having more fine holes more than those in the example shown in FIG. 1 relatively to the recessed portion 54 is used, a melted thermoplastic resin plate (B) (56) is attached to the inner surface of the upper die 53 by vacuum pressure to be formed in a shape along the inner surface of the upper die 53 (step (B)), and the thermoplastic resin plate (B) (56) is welded to the molded article (A) (1) by mold-clamping only in a predetermined region (in the depicted example, only in the circumferential region) (step (C)). By such a molding, the thermoplastic resin molded article 52 having the larger-area hollow portion 51 can be manufactured.

Figure 6:
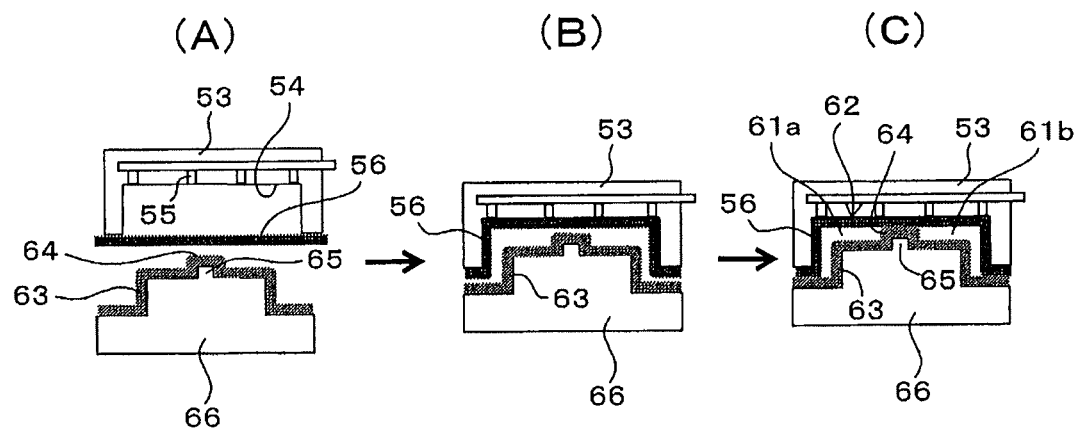
FIG. 6 is a process flow diagram showing a method of manufacturing a thermoplastic resin molded article according to a still further example.

Further, in the example shown in FIG. 6, as compared to the example shown in FIG. 5, a thermoplastic resin molded article 62, in which the large-area hollow portion 51 shown in FIG. 5 is divided into a hollow portion 61a and a hollow portion 61b, is manufactured. In this example, a projected portion 64 is formed at the central part of the upper surface of a molded article (A) (63) which is premolded, and the molded article (A) (63) is set on a lower die 66 having an upper surface convex 65 formed in a shape corresponding to this projected portion 64 (step (A)). As an upper die 53, one similar to that shown in FIG. 5 is used, and a melted thermoplastic resin plate (B) (56) is attached to the inner surface of the upper die 53 by vacuum pressure to be formed in a shape along the inner surface of the upper die 53 (step (B)), and the thermoplastic resin plate (B) (56) is welded to the molded article (A) (63) by mold-clamping only in a predetermined region (in the depicted example, only in the circumferential region and the central region) (step (C)). By such a molding, the thermoplastic resin molded article 62 having the large-area and divided hollow portions 61a and 61b can be manufactured.

Figure 7:
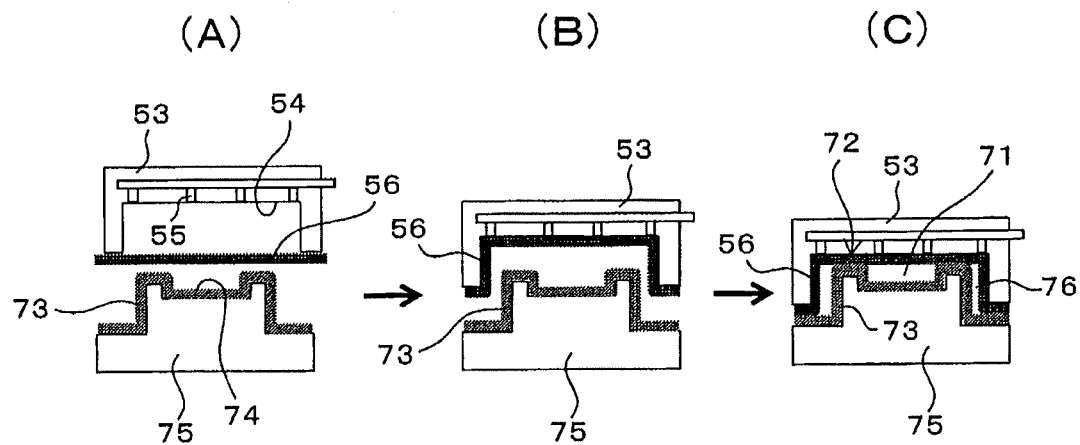
FIG. 7 is a process flow diagram showing a method of manufacturing a thermoplastic resin molded article according to a still further example.

Further, in the example shown in FIG. 7, as compared to the example shown in FIG. 2, a thermoplastic resin molded article 72 having a hollow portion 71 formed in a larger area at the central part is manufactured. In this example, a recessed portion 74 larger in area than that shown in FIG. 2 is formed on the upper surface of the central part of a molded article (A) (73) which is premolded, and the molded article (A) (73) is set on a lower die 75 having an upper surface concave formed in a shape corresponding to this recessed portion 74 (step (A)). As an upper die 53, one similar to that shown in FIG. 5 is used, and a melted thermoplastic resin plate (B) (56) is attached to the inner surface of the upper die 53 by vacuum pressure to be formed in a shape along the inner surface of the upper die 53 (step (B)), and the thermoplastic resin plate (B) (56) is welded to the molded article (A) (73) by mold-clamping only in a predetermined region (in the depicted example, only in the outer circumferential region and the circumferential region of the central part) (step (C)). By such a molding, the thermoplastic resin molded article 72 having the hollow portion 71 at the central part and a hollow portion 76 at the circumferential part can be manufactured.

Figure 8:
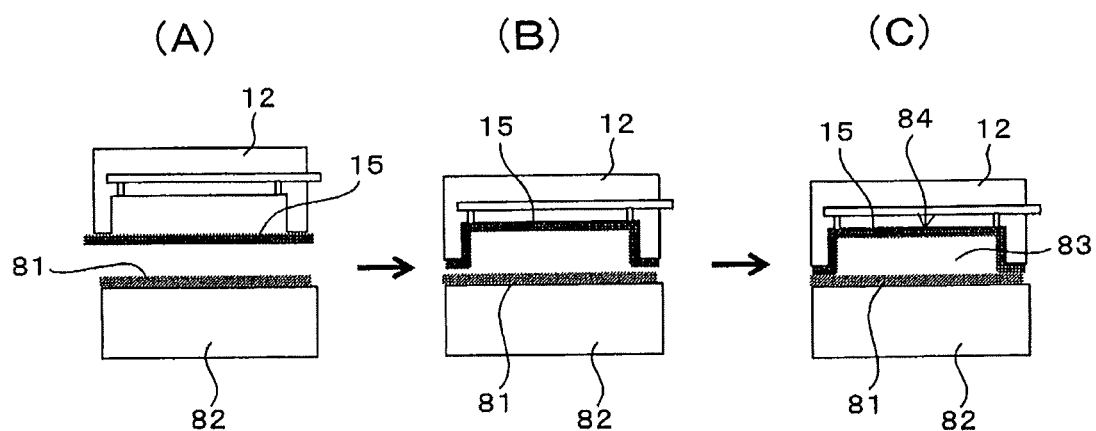
FIG. 8 is a process flow diagram showing a method of manufacturing a thermoplastic resin molded article according to a still further example.

In the example shown in FIG. 8, as compared to the example shown in FIG. 1, a molded article (A) (81), which is premolded, is formed in a flat plate-like shape, this molded article (A) (81) is set on a lower die 82 the upper surface of which is formed as a plane (step (A)), similarly to the example shown in FIG. 1, the melted thermoplastic resin plate (B) (15) is attached to the inner surface of the upper die 12 by vacuum pressure to be formed in a shape along the inner surface of the upper die 12 (step (B)), and the thermoplastic resin plate (B) (15) is welded to the molded article (A) (81) by mold-clamping only in a predetermined region (in the depicted example, only in the circumferential region) (step (C)). By such a molding, a thermoplastic resin molded article 84 having a large-area hollow portion 83 at the central part can be manufactured.

Thus, various examples can be employed as the thermoplastic resin molded article having a hollow portion and the method of manufacturing the same, and examples other than the above-described examples shown in the figures can be employed.

Figure 9:
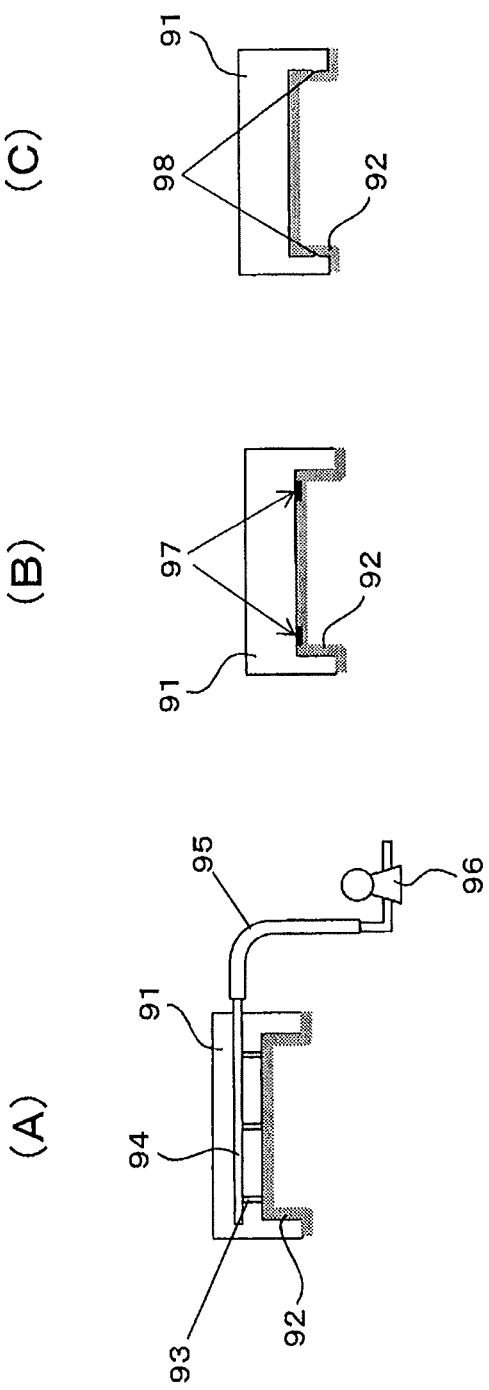
FIG. 9 is a schematic diagram showing an example of a method of retaining a molded article (A).

As a method of retaining the above-described molded article (A) on the first die, various methods can be appropriately applied. For example, as exemplified in FIG. 9 with a case where an upper die 91 is used as the first die, as shown in FIG. 9(A), suction holes 93 are provided to retain a molded article (A) (92) by vacuum suction on the lower surface of an upper die 91 and by sucking from the respective suction holes 93 by a vacuum pump 96 through a suction path 94 and a vacuum line 95, the molded article (A) (92) can be securely retained at a predetermined condition. Further, as shown in FIG. 9(B), an adhesive tape 97 is stuck at an adequate position on the lower surface of the upper die 91, and the molded article (A) (92) can also be securely retained at a predetermined condition via the adhesive tape 97. Moreover, as shown in FIG. 9(C), for example, appropriately small undercut portions 98 are provided on both inner side surfaces of the upper die 91, and by these undercut portions 98, the molded article (A) (92) can also be retained at a predetermined condition relative to the upper die 91. Furthermore, retaining methods other than these methods shown in the figures can be employed.

Figure 10:
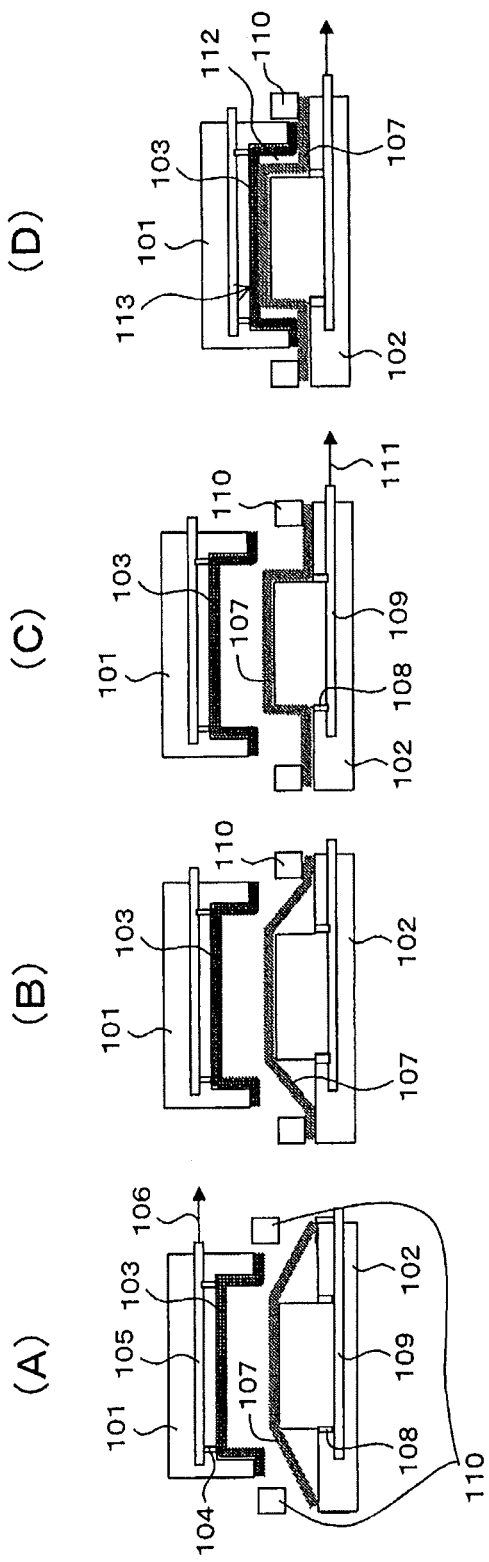
FIG. 10 is a process flow diagram showing a method of manufacturing a thermoplastic resin molded article according to a still further example.

Further, for example, as shown in FIG. 10, an upper die 101 is used as the first die and a lower die 102 is used as the second die, respectively, fine holes 104 to retain molded article (A) (103) on the lower surface of the upper die 101 by vacuum suction are provided, the molded article (A) (103) is retained at a predetermined condition by suction from the respective fine holes 104 through a suction path 105 and a vacuum line 106, and in the lower die 102, fine holes 108 and a suction path 109 can be provided to attach a melted thermoplastic resin plate (B) (107) to the surface of the lower die 102 by vacuum pressure (step (A)). A press as a pressing means 110 is provided for holding down the outer circumferential part of the thermoplastic resin plate (B) (107) disposed at a predetermined position relatively to the lower die 102, and while the outer circumferential part of the thermoplastic resin plate (B) (107) is held down by the pressing means 110 (step (B)), the thermoplastic resin plate (B) (107) is formed along the surface of the lower die 102 by sucking the thermoplastic resin plate (B) (107) through the fine holes 108, the suction path 109 and a vacuum line 111 (step (C)). The formed thermoplastic resin plate (B) (107) is welded to the molded article (A) (103) by mold-clamping only in a predetermined region ((in the depicted example, only in the circumferential region) (step (D)), and a thermoplastic resin molded article 113 formed with a hollow portion 112 can be manufactured.

Figure 11:
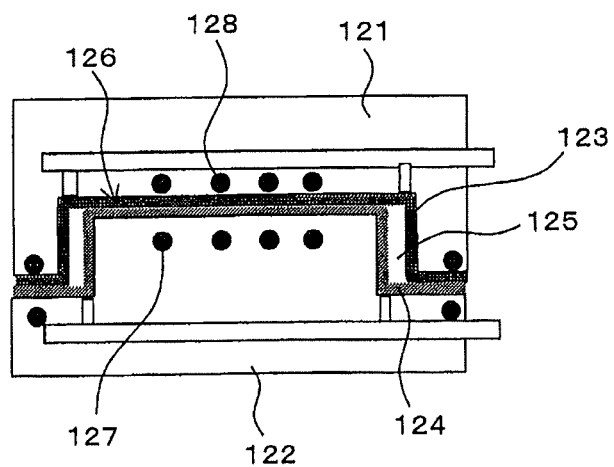
FIG. 11 is a vertical sectional view of a mold showing a method of manufacturing a thermoplastic resin molded article according to a still further example.

Furthermore, for example, as shown in FIG. 11, when a molded article (A) (123) and a thermoplastic resin plate (B) (124) are welded in a predetermined region by mold-clamping of an upper die 121 as the first die and a lower die 122 as the second die to manufacture a thermoplastic resin molded article 126 having a hollow portion 125, in particular, a heater 127 as a heating means is provided at a portion corresponding to at least part of the welded region in the lower die 122, and the welding can be performed utilizing the heating due to the heater 127. As aforementioned, because the heater 127 also serves to melt the thermoplastic resin molded article 126, it may be provided over a wider region of the lower die 122, for example, substantially over the entire region. Similarly, a heater 128 as a heating means may be provided at a portion corresponding to at least part of the welded region in the upper die 121, further over a wider region, for example, substantially over the entire region.

INDUSTRIAL APPLICATIONS

The thermoplastic resin molded article having a hollow portion and the method of manufacturing the same are suitable in particular for a thin, large-area and large-sized molded article part of which is formed in a hollow structure part, and suitable, for example, for a monocoque body of an automobile or a large-sized bonnet, further, panels and the like of various large-sized structural bodies.

The invention claimed is:

1. A method of manufacturing a thermoplastic resin molded article having a hollow portion comprising:
    premolding thermoplastic resin into a molded article (A) having a predetermined shape that is a same shape as that of an entire die surface of a first die in a subsequent step;
    setting the molded article (A) in the first die;
    forming a melted thermoplastic resin plate (B) in a shape along an inner surface of a second die facing said first die by being attached to said inner surface of said second die by vacuum pressure;
    welding said thermoplastic resin plate (B) and said molded article (A) only in a predetermined region by mold-clamping said first die and said second die; and
    forming at least part of an unwelded region as a hollow portion.

2. The method according to claim 1, wherein at least said thermoplastic resin plate (B) among said molded article (A) and said thermoplastic resin plate (B) comprises a fiber reinforced thermoplastic resin.

3. The method according to claim 2, wherein reinforcing fibers of said fiber reinforced thermoplastic resin are at least one kind of fibers selected from the group consisting of carbon fibers, glass fibers and aramide fibers.

4. The method according to claim 2, wherein reinforcing fibers of said fiber reinforced thermoplastic resin comprise discontinuous fibers.

5. The method according to claim 4, wherein a weight average fiber length of said discontinuous fibers is 10 mm or more.

6. The method according to claim 4, wherein a content of said discontinuous fibers in said fiber reinforced thermoplastic resin is 5 to 50 wt. %.

7. The method according to claim 2, wherein reinforcing fibers of said fiber reinforced thermoplastic resin comprise continuous fibers.

8. The method according to claim 7, wherein said reinforcing fibers comprise continuous fibers arranged in one direction.

9. The method according to claim 7, wherein a content of said continuous fibers in said fiber reinforced thermoplastic resin is 1 to 80 wt. %.

10. The method according to claim 7, wherein said reinforcing fibers of said fiber reinforced thermoplastic resin are formed as a woven fabric.

11. The method according to claim 7, wherein said thermoplastic resin plate (B) comprises a tape-like fiber reinforced thermoplastic resin pre-integrated with reinforcing fibers arranged in one direction and a thermoplastic resin by heat press.

12. The method according to claim 11, wherein a tape width of said tape-like fiber reinforced thermoplastic resin is 6 to 50 mm.

13. The method according to claim 1, wherein a die having holes that suck air from an interior of a cavity is used as said second die.

14. The method according to claim 1, wherein a die having suction holes that retain said molded article (A) is used as said first die.

15. The method according to claim 1, wherein a thermoplastic resin forming said molded article (A) and said thermoplastic resin plate (B) comprises at least one selected from the group consisting of a polyphenylene sulfide resin, a polyamide resin, a polyolefin resin, a polyester resin, an ABS resin, a polycarbonate resin and a polyacetal resin.

16. The method according to claim 1, wherein said thermoplastic resin plate (B) is formed while an outer circumferential part of said thermoplastic resin plate (B) is held down.

17. The method according to claim 1, wherein a heater is provided at a portion corresponding to at least part of said welded region at least in said second die, and said welding is performed utilizing heat from said heater.

* * * * *